United States Patent
Jahagirdar et al.

(10) Patent No.: US 7,210,054 B2
(45) Date of Patent: Apr. 24, 2007

(54) MAINTAINING PROCESSOR EXECUTION DURING FREQUENCY TRANSITIONING

(75) Inventors: Sanjeev Jahagirdar, Folsom, CA (US); Islam Derhalli, Folsom, CA (US); Varghese George, Folsom, CA (US); Kedar Mangrulkar, Folsom, CA (US); Mathew Nazareth, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 10/180,836

(22) Filed: Jun. 25, 2002

(65) Prior Publication Data

US 2003/0237012 A1   Dec. 25, 2003

(51) Int. Cl.
*G06F 1/04*   (2006.01)
(52) U.S. Cl. ............... 713/502; 713/400; 713/500; 713/501; 713/600
(58) Field of Classification Search ........... 713/400, 713/500, 502, 501, 600
See application file for complete search history.

(56) References Cited

U.S. PATENT DOCUMENTS

| | | | |
|---|---|---|---|
| 5,021,679 A | 6/1991 | Fairbanks et al. | |
| 5,095,280 A | 3/1992 | Wunner | |
| 5,142,247 A * | 8/1992 | Lada et al. ............... | 331/14 |
| 5,153,535 A | 10/1992 | Fairbanks et al. | |
| 5,307,003 A | 4/1994 | Fairbanks et al. | |
| 5,355,090 A * | 10/1994 | Pajowski et al. ........... | 327/292 |
| 5,579,353 A * | 11/1996 | Parmenter et al. .......... | 375/376 |
| 5,594,895 A | 1/1997 | Raymond | |
| 5,627,412 A | 5/1997 | Beard | |
| 5,752,011 A | 5/1998 | Thomas et al. | |
| 5,774,701 A * | 6/1998 | Matsui et al. ............... | 713/501 |
| 5,903,746 A * | 5/1999 | Swoboda et al. ........... | 713/501 |
| 5,974,557 A | 10/1999 | Thomas et al. | |
| 6,163,583 A * | 12/2000 | Lin et al. .................... | 375/354 |
| 6,204,732 B1 * | 3/2001 | Rapoport et al. .............. | 331/2 |
| 6,216,235 B1 | 4/2001 | Thomas et al. | |
| 6,239,626 B1 * | 5/2001 | Chesavage ................... | 327/99 |
| 6,462,592 B1 * | 10/2002 | Yoo ........................... | 327/147 |
| 6,487,668 B2 | 11/2002 | Thomas et al. | |
| 6,519,707 B2 * | 2/2003 | Clark et al. ................. | 713/322 |
| 6,664,775 B1 * | 12/2003 | Clark et al. ................. | 323/351 |
| 6,754,837 B1 * | 6/2004 | Helms ........................ | 713/322 |
| 6,772,356 B1 * | 8/2004 | Qureshi et al. ............. | 713/321 |
| 6,785,829 B1 * | 8/2004 | George et al. .............. | 713/320 |
| 6,831,959 B1 * | 12/2004 | Manchester ................. | 375/354 |
| 2002/0047748 A1 | 4/2002 | Fujita | |

FOREIGN PATENT DOCUMENTS

EP   0602422 A   6/1994

* cited by examiner

*Primary Examiner*—Thomas Lee
*Assistant Examiner*—Vincent Tran
(74) *Attorney, Agent, or Firm*—Blakely, Sokoloff, Taylor & Zafman LLP (57) ABSTRACT

An embodiment of the present invention includes a standby clock generator and a selector. The standby clock generator generates a standby clock synchronous to a core clock. The core clock is generated by a core clock generator during a normal operation mode. The core clock generator stops the core clock during a frequency transition. The selector generates a processor clock from the standby clock during the frequency transition from the normal operation mode according to a selector control signal.

27 Claims, 5 Drawing Sheets

MAINTAINING PROCESSOR EXECUTION DURING FREQUENCY TRANSITIONING

BACKGROUND

1. Field

Embodiments of the invention relate to the field of microprocessors, and more specifically, to frequency management.

2. Background

Advances in microprocessor technology have provided users with high level of performance flexibility. For example, mobile processors offer users two performance modes: Maximum Performance mode and Battery Optimized mode. Maximum Performance mode takes advantage of the additional power provided by an alternating current (AC) power source to provide a new level of mobile personal computer (PC) performance, while Battery Optimized mode provides optimal performance while running on battery. In Maximum Performance mode, the processor delivers highest performance at the expense of high power consumption. In Battery Optimized mode, the processor provides lower performance but consumes much less power.

Recently, demands for high performance have accelerated development of very fast processors at more than 1 GHz operating frequency. Thermal throttling or monitoring and other performance operations feature power management by changing the frequency at which the processor operates. In existing circuits, frequency switching between performance states requires the processor to stop execution during frequency transition. This transitioning from one mode to another may lead to many undesirable effects such as excessive bus master and software latency, end-user visible artifacts (e.g., audio drop-out, video frame loss), and component stress.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the present invention includes a standby clock generator and a selector. The standby clock generator generates a standby clock synchronous to a core clock. The core clock is generated by a core clock generator during a normal operation mode. The core clock generator stops the core clock during a frequency transition. The selector generates a processor clock from the standby clock during the frequency transition from the normal operation mode according to a selector control signal.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 1:
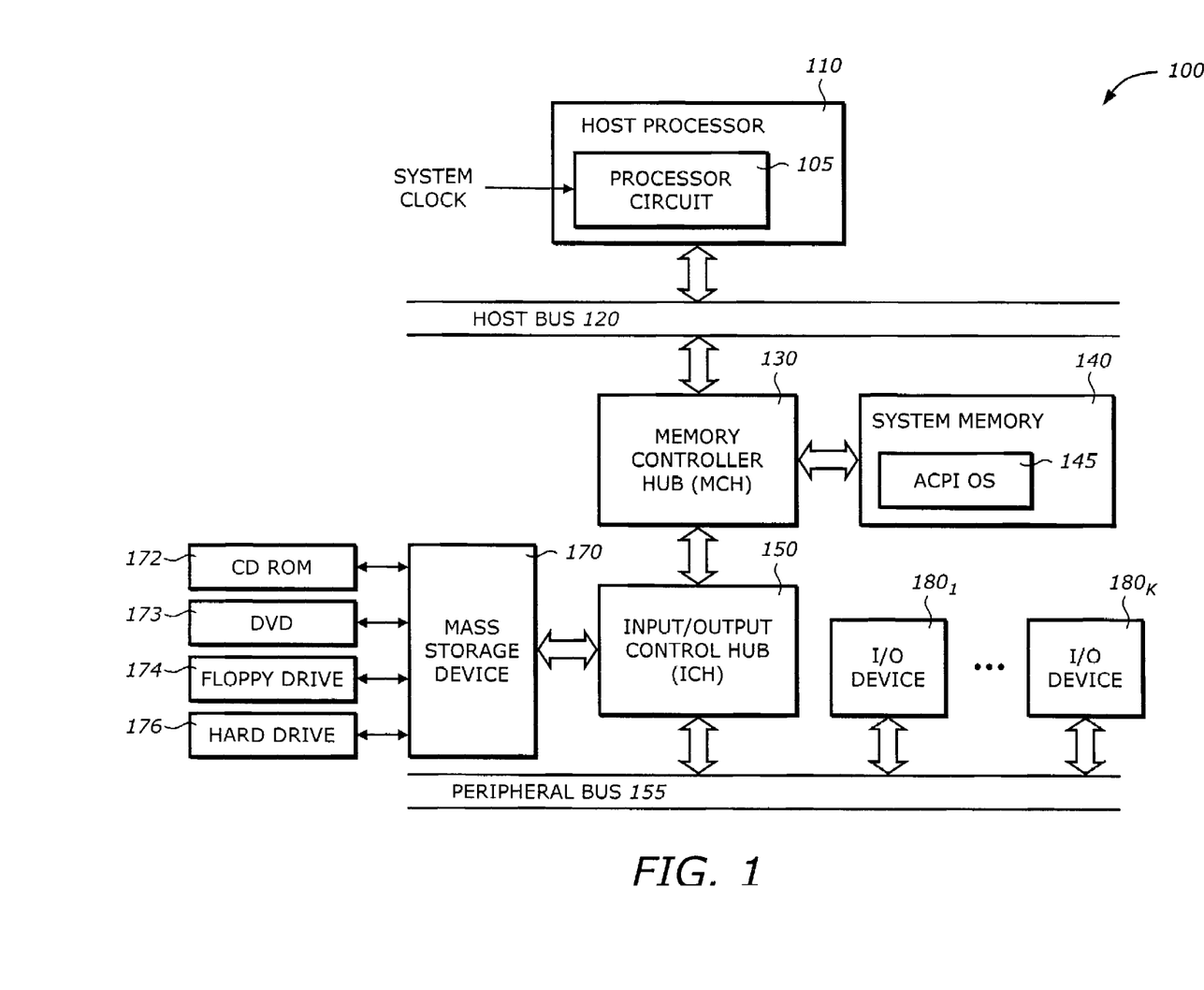
FIG. 1 is a diagram illustrating a system in which one embodiment of the invention can be practiced.

FIG. 1 is a diagram illustrating a system 100 in which one embodiment of the invention can be practiced. The system 100 includes a host processor 110, a host bus 120, a memory control hub (MCH) 130, a system memory 140, an input/output control hub (ICH) 150, a peripheral bus 155, a mass storage device 170, and input/output devices $180_1$ to $180_K$. Note that the system 100 may include more or less elements than these elements.

The host processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The host processor 110 includes a processor circuit 105.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. The MCH 130 interfaces to the peripheral bus 155. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include an operating system or an advanced configuration and power interface (ACPI) operating system (OS) 145. The ACPI OS 145 is the OS that is compatible to the power management scheme as specified in the ACPI standard, published by Compaq Computer Corporation, Intel Corporation, Microsoft Corporation, Phoenix Technologies Ltd, and Toshiba Corporation, Revision 2.0, in Jul. 27 2000. The system memory 140 may also include other programs or data which are not shown.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 155, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, and hard drive 176, and any other magnetic or optic storage devices. The mass storage device 170 provides a mechanism to read machine-accessible media.

The I/O devices $180_1$ to $180_K$ may include any I/O devices to perform I/O functions. Examples of I/O devices $180_1$ to $180_K$ include controller for input devices (e.g., keyboard, mouse, track ball, pointing device), media card (e.g., audio, video, graphics), network card, and any other peripheral controllers.

Figure 2:
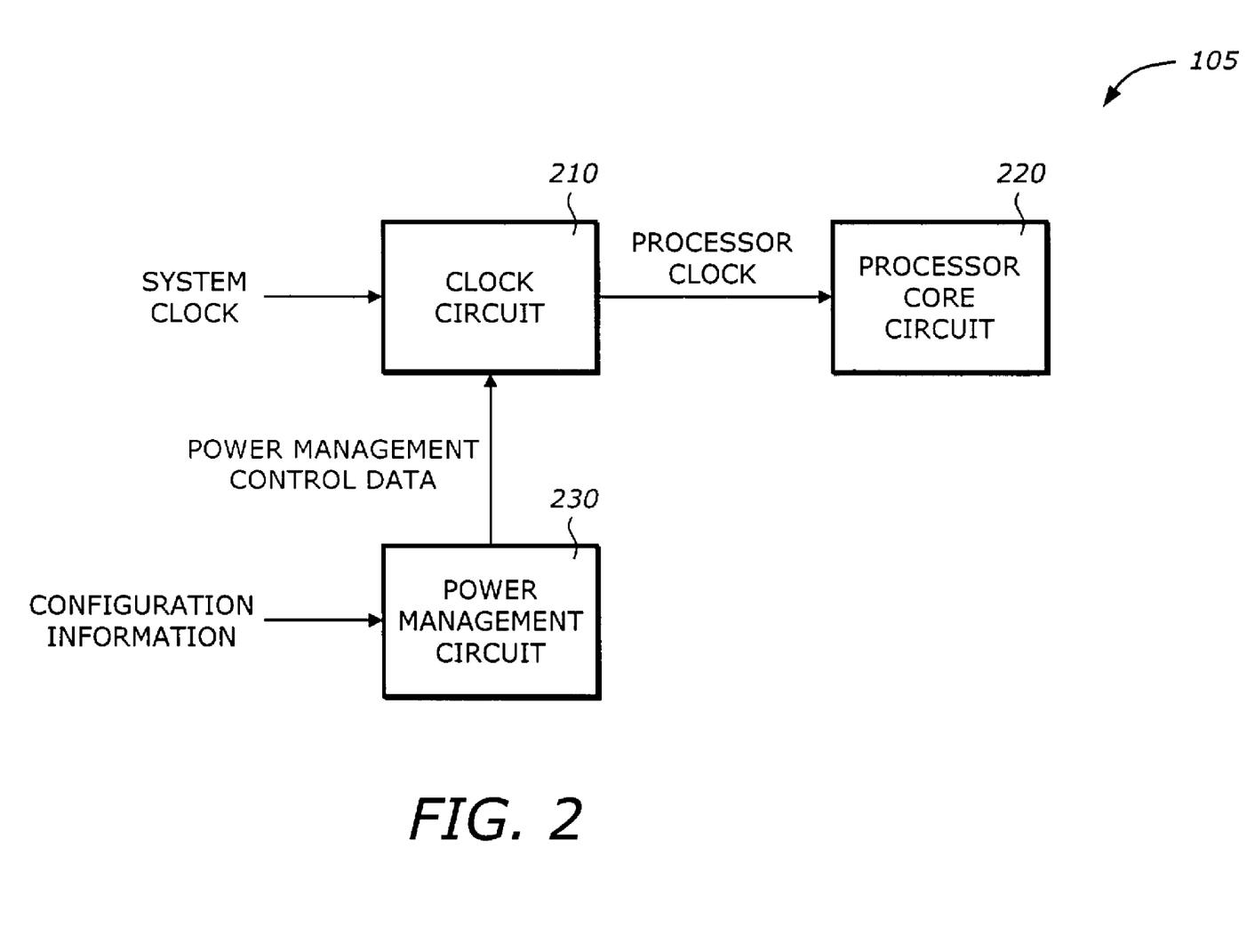
FIG. 2 is a diagram illustrating a processor circuit according to one embodiment of the invention.

FIG. 2 is a diagram illustrating a processor circuit 105 according to one embodiment of the invention. The processor circuit 105 includes a clock circuit 210, a processor core circuit 220, and a power management circuit 230. Note that the power management circuit 230 may be optional. In the following, the term "clock" refers to a clock signal.

The clock circuit 210 generates a processor clock to the processor core circuit 220. The clock circuit 210 receives a system clock from an external source such as a clock signal from a crystal oscillator, a clock generator on the system board, etc. Typically, the system clock provides the basic clock signal in the system from which other clock signals are generated. In addition, the system clock is also stable and is a free-running clock. The clock circuit 210 also receives power management control data from a power management circuit 230. The power management data may be a single bit indicating if a frequency transition is desired due to some thermal throttling or performance switch-over.

The processor core circuit 220 contains the core circuitry for the processor 100. This may include any elements of the processor 100 such as instruction decoder, pipeline registers, execution units (e.g., arithmetic logic unit, floating-point processors), branch prediction logic circuit, etc. The processor core circuit 220 receives the processor clock to clock all the synchronous elements.

The power management circuit 230 generates the power management control data based on the configuration information provided by a power management driver such as one from the ACPI OS 145. The power management circuit 230 may be optional and the power management control data may be provided directly from an external signal to a pin of the processor 110. The pin may be an interrupt pin, a thermal control pin, or any other suitable pin. The power management circuit 230 may include a configuration register that stores configuration information as provided by the driver from the ACPI OS 145.

A performance state of the processor 110 is typically dictated by the frequency at which the processor operates. The higher the frequency, the faster the processor's speed and the higher the performance. A performance state is also related to power consumption and thermal state. A higher performance state consumes higher power and thus generates more heat. The power management policy is one that adjusts the performance state of the processor according to the system and/or user's requirements. This policy may increase or decrease the processor's clock frequency. A frequency transition period is an interval during which the processor's clock frequency is changed.

Figure 3:
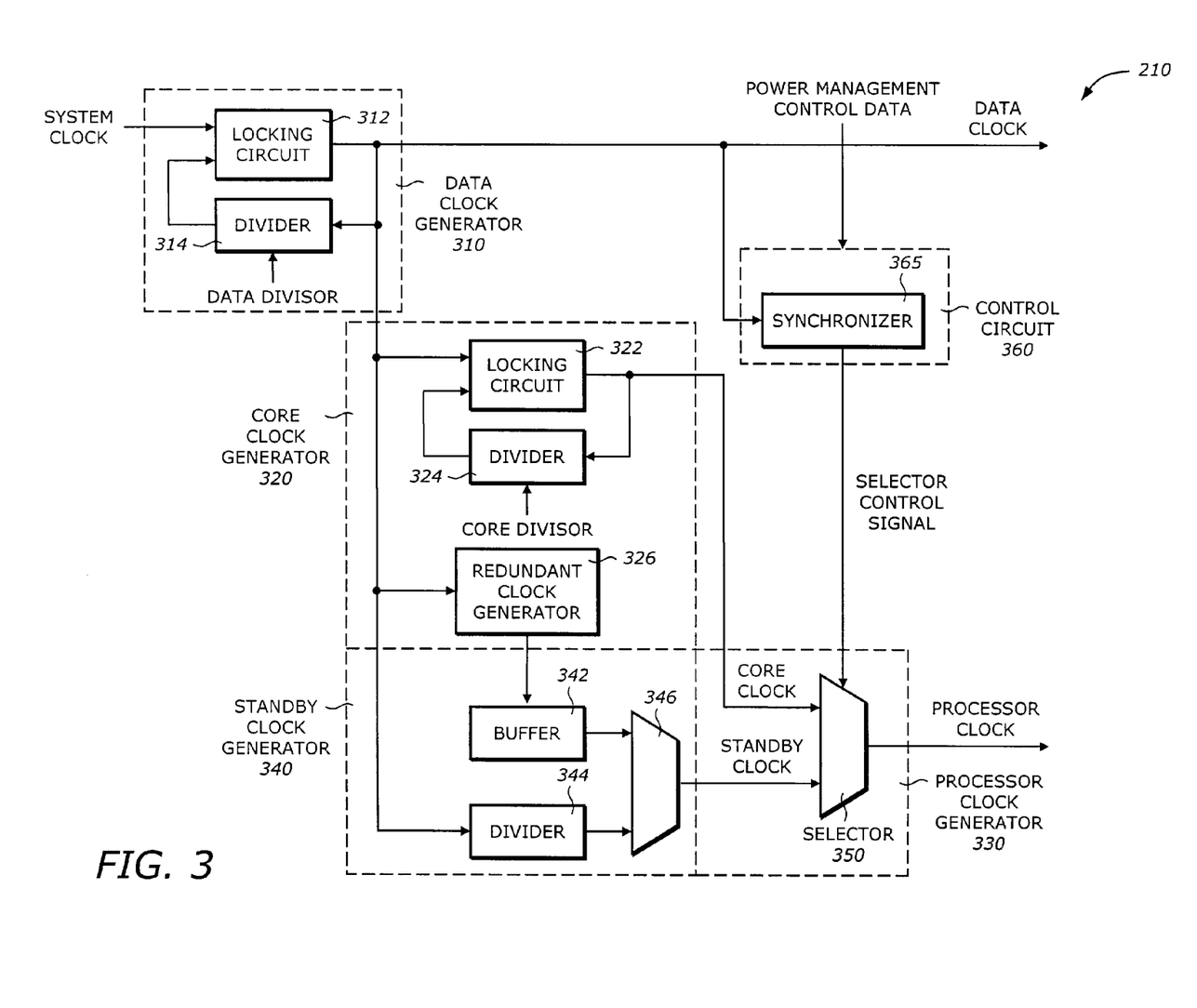
FIG. 3 is a diagram illustrating a clock circuit shown in FIG. 2 according to one embodiment of the invention.

FIG. 3 is a diagram illustrating the clock circuit 210 shown in FIG. 2 according to one embodiment of the invention. The clock circuit 210 includes a data clock generator 310, a core clock generator 320, a processor clock generator 330, and a control circuit 360.

The data clock generator 310 receives the system clock and generates a data clock. The data clock is used to clock the core clock generator 320 and the processor clock generator 330. The data clock may also be used by various circuits in the processor core circuit 220. The data clock generator 310 includes a phase-locked loop (PLL) circuit to synthesize the data clock from the system clock and a data divisor. The PLL circuit includes a locking circuit 312 and a divider 314. The locking circuit 312 locks a data feedback signal from the divider 314 with the system clock to provide the data clock. The locking circuit 312 contains phase-locked loop elements as known by one of ordinary skill in the art such as phase comparator and loop filter. The divider 314 is a divide-by-m circuit that divides the data clock by the data divisor to provide the data feedback signal to the locking circuit 312. The data divisor is an integer, typically fixed and selected for a suitable frequency for the data clock.

The core clock generator 320 generates a core clock from the data clock. The core clock is selected as the processor clock during a normal operation mode. The core clock generator 320 is a PLL circuit to synthesize the core clock from the data clock and a core divisor. The core PLL circuit includes a locking circuit 322 and a divider 324. The locking circuit 322 locks a core feedback signal from the divider with the data clock to provide the core clock. The locking circuit 322 contains phase-locked loop elements as known by one of ordinary skill in the art such as phase comparator and loop filter. The divider 324 is a divide-by-n circuit that divides the core clock by the core divisor to provide the core feedback signal to the locking circuit 322. The core divisor is an integer provided to adjust the frequency of the core clock according to the power management policy. The core divisor may be provided by the power management circuit 230 (FIG. 2) or programmed by the driver in the ACPI OS 145 (FIG. 1). During a thermal throttling or monitoring, the processor clock is to be changed to a different frequency. This change takes place during a frequency transition from the normal operation mode. During this time, the core divisor is changed to a suitable value. The core clock generator 320 stops the core clock during the frequency transition in order to lock on the data clock with the new core divisor. After the frequency transition period, the core clock generator 320 resumes generation of the core clock with the new frequency. The core clock generator 320 may also include a redundant clock generator 336 to generate a redundant clock from the data clock. The redundant clock generator 336 may be any suitable clock synthesizer such as a PLL circuit with a fixed divisor or a divide-by-k circuit. The redundant clock is a stable clock during the frequency transition. Typical values for the frequency of the system clock, data clock, and core clock are 100 MHz, 400 MHz, and 2000 MHz, respectively.

The processor clock generator 330 generates the processor clock to the processor core circuit 220 under the control of the control circuit 360. The processor clock generator 330 includes a standby clock generator 340 and a selector 350.

The standby clock generator 330 generates a stable standby clock synchronous to the core clock. Typically, the standby clock is a free-running clock with frequency selected according to processor architecture and design process. Some of the criteria to select the frequency of the standby clock include the minimum allowable of the core clock frequency, the core PLL support for odd and even divisors, the stability, skew and jitter characteristics of the PLL circuits in the data clock generator 310 and the core clock generator 320. In one embodiment, the standby clock generator includes a buffer 342 and/or a divider 344, and optionally a multiplexer 346. The buffer 342 buffers the redundant clock from the redundant clock generator 336 to provide the standby clock. Since this redundant clock is stable during the frequency transition even when the core PLL locks to the new divisor, the standby clock is stable during this period. The divider 344 divides the data clock with a fixed divisor to provide an alternate standby clock. Since the data clock is stable during the frequency transition, the standby clock so generated is also stable. The multiplexer 346 selects one of the buffered redundant clock and the divided data clock to be the standby clock. The muliplexer 346 may not be needed. The standby clock generator 340 may include only the buffer 342 or only the divider 344.

The selector 350 generates the processor clock from the standby clock during the frequency transition from the normal operation mode according to a selector control signal. The selector 350 selects one of the core clock and the standby clock to provide the processor clock. During the normal operation mode, the selector 350 selects the core clock. During the frequency transition, the selector 350 selects the standby clock. In one embodiment, the selector 350 is a multiplexer having two inputs connected to the core clock and the standby clock.

The control circuit 360 generates the selector control signal to the selector 350 to control selection of one of the core clock and the standby clock. The control circuit 360 receives a command from the power management control data provided by the power management circuit or programmed by the driver in the ACPI OS 145 (FIG. 1) when there is a thermal event that requires a change in the frequency of the processor clock. The control circuit 360 may include a synchronizer 365 to synchronize the selector control signal with the data clock. The synchronizer 365 may be a D flip-flop clocked by the data clock.

Since the processor clock is generated continuously during the normal mode period and the frequency transition period, the processor execution is maintained. Furthermore, if the processor clock or its derivatives is used to clock other elements or circuits, the data integrity is maintained during the frequency transition period.

Figure 4:
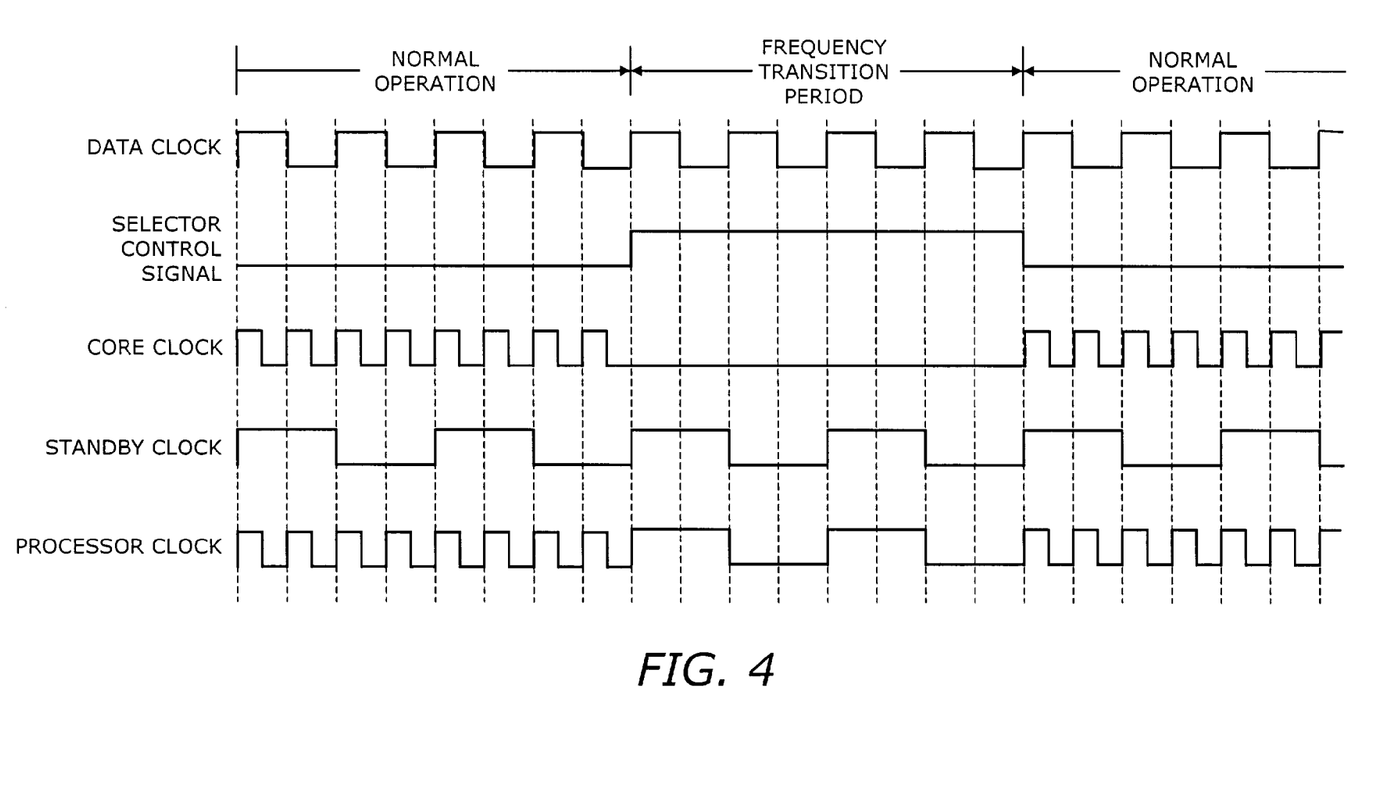
FIG. 4 is a timing diagram illustrating the clock waveforms according to one embodiment of the invention.

FIG. 4 is a timing diagram illustrating the clock waveforms according to one embodiment of the invention. The clock waveforms include the data clock, the selector control signal, the core clock, the standby clock, and the resulting processor clock.

The data clock is a free-running clock from which the core clock and the standby clock are derived. The selector control signal has two states. In a first state (e.g., LOW), the selector control signal is negated corresponding to the normal operation period. During this period, the processor clock is the core clock. In a second state (e.g., HIGH), the selector control signal is asserted corresponding to the frequency transition period. During this period, the core clock is stopped while the core clock generator locks to the new divisor or ratio, and the processor clock is the standby clock. After the frequency transition period is over, the selector control signal is negated low to return to the normal operation mode. The core clock is generated with a new frequency in the normal operation mode. The processor clock is the core clock. Note that the negation and assertion of the selector control signal may be reversed as is known by one of ordinary skill in the art. In other words, the selector control signal may be negated during the frequency transition period and asserted during the normal operation period.

When the frequency transition period is over, the selector control signal is negated so that the processor clock becomes the new core clock. The processor clock, therefore, is continuously running in both normal and frequency transition periods. Many personal computer (PC) platforms or software specify that the processor's unavailability be less than some time period, e.g., 5 μsec. Using the clock circuit as described above, the processor clock is continuously available. Therefore, the processor is almost always available, exceeding the requirements by these PC platforms or software.

Figure 5:
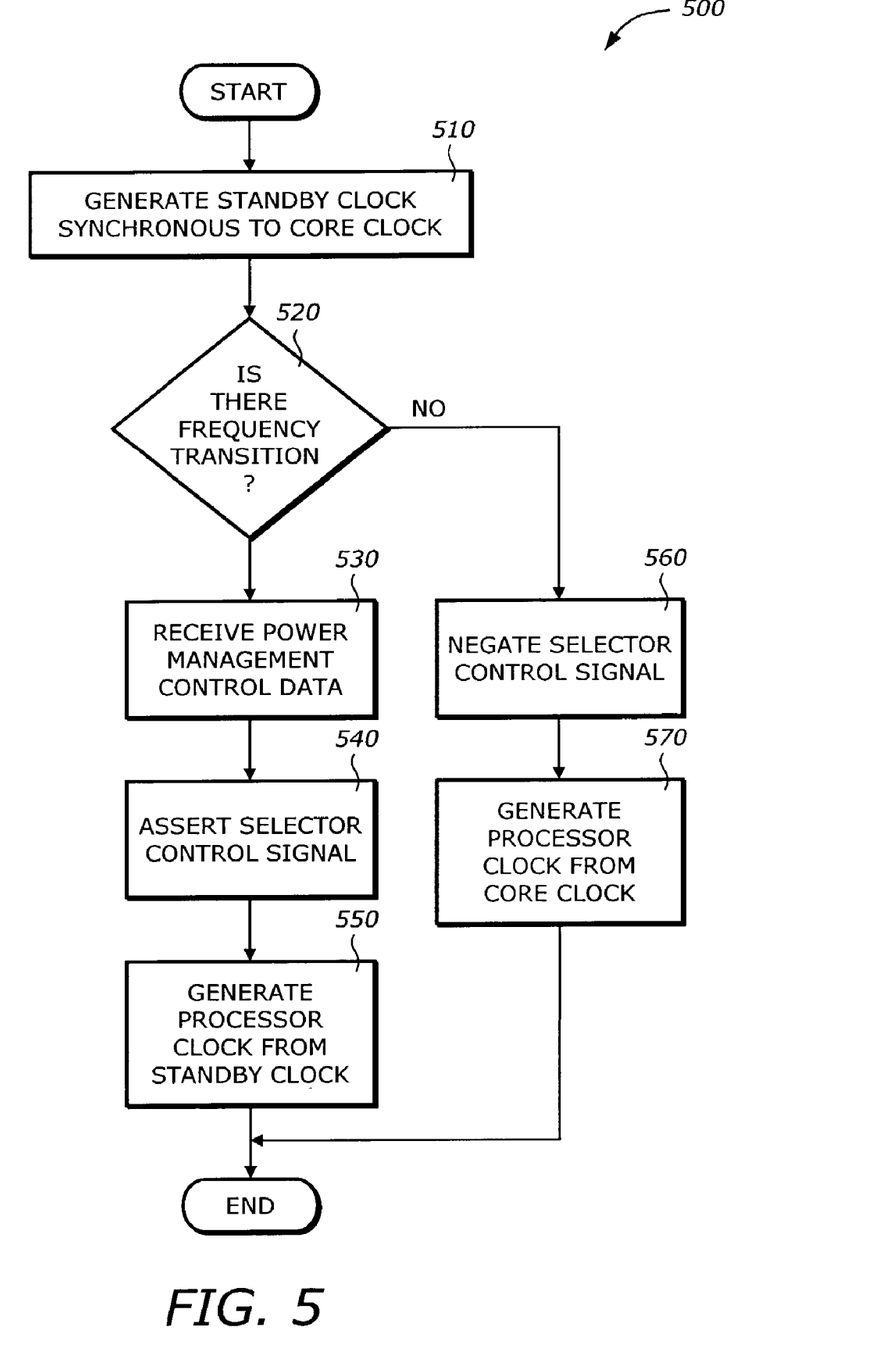
FIG. 5 is a flowchart illustrating a process to generate processor clock according to one embodiment of the invention.

FIG. 5 is a flowchart illustrating a process 500 to generate processor clock according to one embodiment of the invention.

Upon START, the process 500 generates the standby clock synchronous to the core clock (Block 510). The standby clock may be generated from the data clock or from a stable redundant clock from the core clock generator. Next, the process 500 determines if there is a frequency transition due to a thermal event or a power management command (Block 520). If so, the process 500 receives a power management control data or command (Block 530). The process 500 then asserts the selector control signal (Block 540). Next, the process 550 generates the processor clock from the standby clock using the asserted selector control signal (Block 550) and is then terminated or returns back to Block 520.

If there is no frequency transition, the process 500 negates the selector control signal Block 560). Next, the process 500 generates the processor clock from the core clock using the negated selector control signal (Block 570) and is then terminated, or returns back to Block 520.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a standby clock generator to generate a standby clock synchronous to a core clock, the core clock being generated by a core clock generator, the core clock generator stopping the core clock during a frequency transition; and
   a selector coupled to the standby clock generator to generate a processor clock from the standby clock during the frequency transition, and from the core clock during a normal operation mode according to a selector control signal;
   wherein the standby clock generator comprises:
   a buffer to buffer a redundant clock from the core clock generator, the redundant clock being stable during the frequency transition.

2. The apparatus of claim 1 wherein the standby clock generator comprises:
   a divider coupled to a data clock generator to divide a data clock into the standby clock, the data clock being divided by the core clock generator into the core clock.

3. The apparatus of claim 2 further comprising:
   a control circuit coupled to the selector to generate the selector control signal according to a power management policy.

4. The apparatus of claim 3 wherein the control circuit comprises:
a synchronizer to synchronize the selector control signal to the data clock.

5. The apparatus of claim 1 wherein the selector generates the processor clock from the core clock during a normal operation mode.

6. The apparatus of claim 1 wherein the selector comprises:
a multiplexer coupled to the standby clock generator and the core clock generator to select one of the standby clock and the core clock according to the selector control signal, the selected one of the standby clock and the core clock being the processor clock.

7. A method comprising:
generating a standby clock synchronous to a core clock, the core clock being generated by a core clock generator, the core clock generator stopping the core clock during a frequency transition; and
generating a processor clock from the standby clock during the frequency transition, and from the core clock during a normal operation mode according to a selector control signal;
wherein generating standby clock comprises:
buffering a redundant clock form the core clock generator, the redundant clock being stable during the frequency transition.

8. The method of claim 7 wherein generating the standby clock comprises:
dividing a data clock into the standby clock, the data clock being divided by the core clock generator into the core clock.

9. The method of claim 8 further comprising:
generating the selector control signal according to a power management policy.

10. The method of claim 9 wherein generating the selector control signal comprises:
synchronizing the selector control signal to the data clock.

11. The method of claim 7 wherein generating a processor clock comprises:
generating the processor clock from the core clock during a normal operation mode.

12. The method of claim 7 wherein generating a processor clock comprises:
selecting one of the standby clock and the core clock by a multiplexer according to the selector control signal, the selected one of the standby clock and the core clock being the processor clock.

13. A circuit comprising:
a data clock generator to generate a data clock from a system clock;
a core clock generator coupled to the data clock generator to generate a core clock, the core clock generator stopping the core clock during a frequency transition; and
a processor clock generator coupled to the core clock generator to generate a processor clock to a processor core circuit, the processor clock generator comprising:
a standby clock generator to generate a standby clock synchronous to the core clock, and
a selector coupled to the standby clock generator to generate the processor clock from the standby clock during the frequency transition, and from the core clock during a normal operation mode according to a selector control signal;
wherein the standby clock generator comprises:
a buffer to buffer a redundant clock from the core clock generator, the redundant clock being stable during the frequency transition.

14. The circuit of claim 13 wherein the standby clock generator comprises:
a divider coupled to a data clock generator to divide a data clock into the standby clock, the data clock being divided by the core clock generator into the core clock.

15. The circuit of claim 14 further comprising:
a control circuit coupled to the selector to generate the selector control signal according to a power management policy.

16. The circuit of claim 15 wherein the control circuit comprises:
a synchronizer to synchronize the selector control signal to the data clock.

17. The circuit of claim 13 wherein the selector generates the processor clock from the core clock during a normal operation mode.

18. The circuit of claim 13 wherein the selector comprises:
a multiplexer coupled to the standby clock generator and the core clock generator to select one of the standby clock and the core clock according to the selector control signal, the selected one of the standby clock and the core clock being the processor clock.

19. The circuit of claim 13 wherein the data clock generator comprises:
a data phase-locked loop (PLL) circuit to lock a data feedback signal to the system clock using a data divider, the data feedback signal being divided from the data clock by the data divider.

20. The circuit of claim 13 wherein the core clock generator comprises:
a core phase-locked loop (PLL) circuit to lock a core feedback signal to the data clock using a first core divisor during the normal operation mode, the core feedback signal being divided from the core clock by the first core divisor.

21. The circuit of claim 20 wherein the core PLL circuit locks the core feedback signal using a second core divisor during the frequency transition, the core feedback signal being divided from the core clock by the second core divisor.

22. A circuit comprising:
a power management circuit to manage power of a processor core circuit according to a power management policy, and
a clock circuit to provide a processor clock to the processor core circuit according to the power managed by the power management circuit, the clock circuit comprising:
a data clock generator to generate a data clock from a system clock,
a core clock generator coupled to the data clock generator to generate a core clock during a normal operation mode, the core clock generator stopping the core clock during a frequency transition, and
a processor clock generator coupled to the core clock generator to generate a processor clock to a processor core circuit, the processor clock generator comprising:
a standby clock generator to generate a standby clock synchronous to the core clock, and
a selector coupled to the standby clock generator to generate the processor clock from the standby clock during the frequency transition from the normal operation mode according to a selector control signal.

23. The circuit of claim 22 wherein the standby clock generator comprises:
a divider coupled to a data clock generator to divide a data clock into the standby clock, the data clock being divided by the core clock generator into the core clock.

24. The circuit of claim 23 wherein the clock circuit further comprises:
a control circuit coupled to the selector to generate the selector control signal according to the power management policy.

25. The circuit of claim 22 wherein the standby clock generator comprises:
a buffer to buffer a redundant clock from the core clock generator, the redundant clock being stable during the frequency transition.

26. The circuit of claim 22 wherein the selector generates the processor clock from the core clock during the normal operation mode.

27. The circuit of claim 22 wherein the selector comprises:
a multiplexer coupled to the standby clock generator and the core clock generator to select one of the standby clock and the core clock according to the selector control signal, the selected one of the standby clock and the core clock being the processor clock.

* * * * *